(12) United States Patent
Pinault et al.

(10) Patent No.: US 11,557,441 B2
(45) Date of Patent: Jan. 17, 2023

(54) METHOD FOR PREPARING AN ELECTRODE COMPRISING A SUBSTRATE, ALIGNED CARBON NANOTUBES AND A METAL OXIDE DEPOSITED BY OXIDATIVE DEPOSITION, THE ELECTRODE AND USES THEREOF

(71) Applicant: COMMISSARIAT A L'ENERGIE ATOMIQUE ET AUX ENERGIES ALTERNATIVES, Paris (FR)

(72) Inventors: Mathieu Pinault, Fresnes (FR); Fouad Ghamouss, Joues-les-Tours (FR); Francois Tran Van, Fondettes (FR); Emeline Charon, Paris (FR); Baptiste Pibaleau, Savigny sur Orge (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 391 days.

(21) Appl. No.: 16/628,950

(22) PCT Filed: Jul. 6, 2018

(86) PCT No.: PCT/FR2018/051708
§ 371 (c)(1),
(2) Date: Apr. 14, 2020

(87) PCT Pub. No.: WO2019/008299
PCT Pub. Date: Jan. 10, 2019

(65) Prior Publication Data
US 2020/0286690 A1    Sep. 10, 2020

(30) Foreign Application Priority Data
Jul. 7, 2017 (FR) ..................... 17 56474

(51) Int. Cl.
| | | |
|---|---|---|
| *H01G 11/36* | (2013.01) | |
| *C01B 32/158* | (2017.01) | |
| *C25D 13/02* | (2006.01) | |
| *C25D 13/12* | (2006.01) | |
| *H01G 11/46* | (2013.01) | |
| *H01G 11/62* | (2013.01) | |
| *B82Y 30/00* | (2011.01) | |
| *B82Y 40/00* | (2011.01) | |

(52) U.S. Cl.
CPC .......... *H01G 11/36* (2013.01); *C01B 32/158* (2017.08); *C25D 13/02* (2013.01); *C25D 13/12* (2013.01); *H01G 11/46* (2013.01); *H01G 11/62* (2013.01); *B82Y 30/00* (2013.01); *B82Y 40/00* (2013.01); *C01B 2202/08* (2013.01)

(58) Field of Classification Search
None
See application file for complete search history.

(56) References Cited

FOREIGN PATENT DOCUMENTS

| CN | 103346021 A | 10/2013 |
|---|---|---|
| WO | WO 2009/103925 A2 | 8/2009 |
| WO | WO 2015/071408 A1 | 5/2015 |

OTHER PUBLICATIONS

U.S. Appl. No. 13/808,409, filed Mar. 19, 2013, US 2013/0189586 A1, Sarrazin et al.
U.S. Appl. No. 16/488,798, filed Feb. 28, 2018, Pinault et al.
International Search Report dated Oct. 17, 2018 in PCT/FR2018/051708 filed on Jul. 6, 2018, 3 pages.
Preliminary French Search Report dated Feb. 26, 2018 in French Application No. 1756474 filed on Jul. 7, 2017, 2 pages.
Kavian et al., "Composite Supercapacitor Electrodes by Electrodeposition of $MnO_2$ on MWCNT Felt Directly Grown on Aluminum", Journal of New Materials for Electrochemical Systems, 2015, vol. 18, 7 total pages, XP055454244, Retrieved from the Internet: URL: http://new-mat.org/ejournal/index.php/jnmes/article/view/388.
Zhang et al., "Growth of Manganese Oxide Nanoflowers on Vertically-Aligned Carbon Nanotube Arrays for High-Rate Electrochemical Capacitive Energy Storage", Nano Letters, 2008, vol. 8, No. 9, pp. 2664-2668, XP055454213.
Fan et al., "Preparation and characterization of manganese oxide/CNT composites as supercapacitive materials", Diamond & Related Materials, 2006, vol. 15, No. 9, pp. 1478-1483, XP028000693.
Zhou et al., "High-performance supercapacitors using a nanoporous current collector made from super-aligned carbon nanotubes", Nanotechnology, 2010, vol. 21, No. 34, pp. 1-7, XP020196037.
Liu et al., "Hybrid Supercapacitor Based on Coaxially Coated Manganese Oxide on Vertically Aligned Carbon Nanofiber Arrays", Chemistry of Materials, 2010, vol. 22, No. 17, pp. 5022-5030, XP055454216.
Rehnlund et al., "Electrodeposition of Vanadium Oxide/Manganese Oxide Hybrid Thin Films on Nanostructured Aluminum Substrates", Journal of The Electrochemical Society, 2014, vol. 161, No. 10, pp. D515-D521, XP055454218.
Fan et al., "High dispersion of $\gamma$-$MnO_2$ on well-aligned carbon nanotube arrays and its application in supercapacitors", Diamond & Related Materials, 2008, vol. 17, pp. 1943-1948.
Amade et al., "Optimization of $MnO_2$/vertically aligned carbon nanotube composite for supercapacitor application", Journal of Power Sources, 2011, vol. 196, pp. 5779-5783.

(Continued)

*Primary Examiner* — Sarah A. Slifka
(74) *Attorney, Agent, or Firm* — Oblon, McClelland, Maier & Neustadt, L.L.P.

(57) ABSTRACT

The present invention relates to a method for preparing an electrode comprising a metal substrate, vertically aligned carbon nanotubes and a metal oxide deposited over the entire length of said vertically aligned carbon nanotubes, said method comprising the following consecutive steps: (a) synthesizing, on a metal substrate, a mat of vertically aligned carbon nanotubes; (b) electrochemically depositing the metal oxide on said carbon nanotubes from an electrolytic solution comprising at least one precursor of said metal oxide and at least one nitrate, said electrochemical deposition being carried out by a chronopotentiometry technique. The present invention also relates to the electrode thus prepared and to the uses thereof.

13 Claims, 3 Drawing Sheets

(56) References Cited

OTHER PUBLICATIONS

Pinault et al., "Growth of multiwalled carbon nanotubes during the initial stages of aerosol-assisted CCVD", Carbon, 2005, vol. 43, pp. 2968-2976.

Pinault et al., "Evidence of Sequential Lift in Growth of Aligned Multiwalled Carbon Nanotube Multilayers", Nano Letters, 2005, vol. 5, No. 12, pp. 2394-2398.

Doerfler et al., "High power supercap electrodes based on vertical aligned carbon nanotubes on aluminum", Journal of Power Sources, 2013, vol. 227, pp. 218-228.

Liatard et al., "Vertically-aligned carbon nanotubes on aluminum as a light-weight positive electrode for lithium-polysulfide batteries", Royal Society of Chemistry, Chem. Commun., 2015, vol. 51, pp. 7749-7752.

Arcila-Velez et al., "Roll-to-roll synthesis of vertically aligned carbon nanotube electrodes for electrical double layer capacitors", Nano Energy, 2014, vol. 8, pp. 9-16.

METHOD FOR PREPARING AN ELECTRODE COMPRISING A SUBSTRATE, ALIGNED CARBON NANOTUBES AND A METAL OXIDE DEPOSITED BY OXIDATIVE DEPOSITION, THE ELECTRODE AND USES THEREOF

TECHNICAL FIELD

The present invention belongs to the field of devices for storing and restoring electrical energy and more particularly to the field of electrodes notably useful for supercapacitors.

Indeed, the present invention relates to a method for preparing an electrode having (i) a metal substrate, (ii) carbon nanotubes vertically aligned on said substrate and (iii) a metal oxide deposited over the whole length of said carbon nanotubes by oxidative deposition, i.e. by anodic electrochemical deposition.

The present invention also relates to said electrode thereby prepared and the different uses thereof and notably in a supercapacitor.

PRIOR ART

To enable the development of renewable energies and the reduction of gas emissions, the storage of electricity is one of the greatest challenges to meet. Among the numerous autonomous sources, supercapacitors, based on rapid ion charge/discharge cycles on carbon containing surfaces, lie between capacitors and batteries. Their storage efficiency (>95%), their safety, their reliability and their lifetime make them good candidates for complementing or replacing existing solutions such as, for example, electrochemical batteries, flywheels or magnetic storage.

Supercapacitors, the market of which is rapidly expanding, have two electrodes, i.e. an anode and a cathode, which are electrically isolated by a separator, an electrolyte being arranged between each electrode and the separator.

One of the important parameters for a supercapacitor is the capacitance of the system. The latter mainly depends on the correlation between the materials chosen for the electrodes, the design of these electrodes and the electrolyte.

In commercially available supercapacitors, the surface of the electrodes is composed of activated carbon. The latter is a porous material, electron conducting, electrochemically stable and supplying a high surface area per unit of volume, i.e. greater than 500 $m^2 \cdot g^{-1}$. However, the porosity of activated carbon is difficult to control: it depends, on the one hand, on the porosity of the raw material used such as carbon rich organic plant matter and, on the other hand, the physical or chemical activation method implemented. The existence of a complex and poorly controlled porosity in the activated carbon and also the existence of undesirable functional groups on its surface affect the capacitance and the performances of supercapacitors made of activated carbon.

In this context, the use of nanomaterials well organised at the nanometric scale such as vertically aligned carbon nanotubes (VACNTs) is very promising. Several electrode materials based on VACNTs have demonstrated interesting specific capacitances, thereby validating the interest of such a configuration (alignment and regular spacing of the nanotubes in the material) in terms of gain in energy and especially power of the supercapacitor. It should be noted that, within the context of supercapacitors, the metal substrate on which the VACNTs are prepared is used as current collector. To minimise the weight of the electrodes and, consequently, the weight of the supercapacitors, light metal substrates such as aluminium substrates are to be favoured.

To increase the stored energy of VACNTs, one of the solutions consists in combining them with electroactive materials deposited on the VACNTs such as electron conducting polymers (ECP) or metal oxides. This is then known as pseudocapacitance. In this case, the energy is stored by two simultaneous processes: electrostatic process and redox process.

With regard to electrode materials based on VACNTs and metal oxide, manganese oxide ($MnO_2$) is one of the most promising materials on account of its low cost, its natural abundance, its environmentally friendly aspect and its pseudocapacitive performances. The electrochemical performances of $MnO_2$ depend to a large extent on its morphological properties and its specific surface. In general, the chemical structure, the morphology, the specific surface, the porosity, the electrical conductivity and ionic transport in the pores play a crucial role in the determination of the electrochemical performances of $MnO_2$.

Among methods that can be used to deposit $MnO_2$ may be cited electrochemical deposition, hydrothermal deposition, sol-gel synthesis but also reductive deposition or spontaneous chemical deposition. The prior art is rich with publications linked to the electrochemical deposition of $MnO_2$ on VACNTs.

Indeed, Fan et al, 2008, [1], have prepared VACNTs directly on graphite by PE-HF-CVD (Plasma-Enhanced Hot Filament Chemical Vapour Deposition) then the VACNTs, of 1.5 μm length, were coated with $MnO_2$ via a galvanostatic electrochemical deposition in which an electrolyte based on 0.1 M sodium sulphate and 5 $g \cdot L^{-1}$ polyglycol and a so-called "supplied solution" of 0.1 M manganese acetate and 0.1 M sodium sulphate are used (cf. diagram 1, page 1944). The characterisation of the electrode thereby obtained shows a specific capacitance of 784 $Fg^{-1}$ per mass of oxide and a total capacitance of the VACNT/$MnO_2$ composite of 234 $Fg^{-1}$.

Amade et al, 2011, [2], have shown the deposition of $MnO_2$ by electrochemical deposition (galvanostatic or potentiostatic) on the surface of VACNTs formed by PECVD (Plasma-Enhanced Chemical Vapour Deposition) in the presence of $NH_3$ on silicon substrate (carpet of 10 μm length) and obtain specific capacitances going up to 642 $Fg^{-1}$ per mass of oxide. However, the $MnO_2$ only seems to be associated with the carbon nanotubes (CNTs) at the surface and no proof is provided of the presence of the oxide along the CNTs at the core of the aligned carpets. Even more important, the total capacitance of the VACNT/$MnO_2$ composite is not given.

The patent application CN 103346021 [3] discloses the elaboration of electrochemical capacitors in which the positive electrode is constituted of a composite based on a carpet of aligned carbon nanotubes which may be directly formed on a conductive substrate and manganese oxide or polyaniline and the negative electrode is constituted of a carpet of aligned carbon nanotubes which may be directly formed on a conductive substrate and polypyrrole, the electrolytes being non-aqueous electrolytes. In one of the examples disclosed, the VACNTs are formed on a sheet of titanium at 800° C. with ferrocene/ethanol in the presence of argon/hydrogen. Then, these VACNTs are brought into contact with a solution of sodium sulphate and $Mn^{2+}$ ions and $MnO_2$ is electrodeposited on the VACNTs in a quantity of 47% by weight compared to the total weight of the composite via a constant chronoamperometry technique.

Thus, the anodic electrochemical deposition method is very often used for the production of $MnO_2$ from an aqueous solution containing $Mn^{2+}$ cations. However, said deposition requires a polarisation of the substrate to cover by the $MnO_2$ (working electrode) which can generate its oxidation and its corrosion (dissolution). Aluminium is a current collector particularly sensitive to the phenomenon of corrosion notably in aqueous medium and more particularly when it is polarised anodically.

Due to the increasing interest in supercapacitors, the Inventors have set themselves the aim of proposing an industrialisable method making it possible to obtain an electrode notably intended to be used in a supercapacitor which has (i) a metal substrate, (ii) VACNTs on said substrate and (iii) a metal oxide electrodeposited, in a homogeneous manner, over the whole length of said VACNTs, said method having to be able to be applied whatever the metal substrate implemented.

DESCRIPTION OF THE INVENTION

The present invention makes it possible to resolve the technical problems as defined previously and to attain the aim that the Inventors have set themselves.

Indeed, the works of the inventors have made it possible to develop an industrialisable method making it possible to obtain an electrode with a metal substrate on which carbon nanotubes are vertically aligned and coated with a metal oxide, said electrode having interesting performances in terms of capacitance for notably an application in a supercapacitor. As a reminder, capacitance is the property of the electrical conductor to contain a certain electrical charge level for a determined electric potential.

More particularly, the present invention relates to a method for preparing an electrode comprising a metal substrate, vertically aligned carbon nanotubes and a metal oxide deposited over the whole length of said vertically aligned carbon nanotubes, said method comprising the following successive steps:

a) synthesizing, on a metal substrate, a carpet of vertically aligned carbon nanotubes;

b) electrochemically depositing said metal oxide on said carbon nanotubes from an electrolytic solution comprising at least one precursor of said metal oxide and at least one nitrate as anion of the electrolyte.

The inventors have associated, with the synthesis of a carpet of VACNTs on a metal substrate, an electrochemical deposition of metal oxide in particular conditions making it possible to obtain a homogeneous deposition over the whole length of the VACNTs, that is to say in the thickness of the carpet of VACNTs and this without eroding said substrate. These particular conditions are linked to the physicochemical properties of the electrolytic solution.

Within the scope of the present invention, the essential elements contained in the particular electrolytic solution implemented during the electrochemical deposition are at least one precursor of said metal oxide necessary to obtain the electrodeposition of the metal oxide and a particular electrolyte being in the form of a salt the anion of which is a nitrate ($NO_3^-$). Indeed, surprisingly, despite the corrosive character of the numerous salts that this electrolytic solution can contain vis-à-vis aluminium (see point I in the experimental section hereafter), an electrolytic solution comprising a nitrate makes it possible to prepare an electrode having good performances and thus particularly suited to a use in a supercapacitor and this whatever the chemical nature of the substrate implemented.

The present invention applies to any type of vertically aligned carbon nanotubes, whatever their method of preparation. Thus, the carbon nanotubes implemented within the scope of the present invention may be nanotubes with a single layer of graphene (SWNTs), nanotubes with two layers of graphene (DWNTs), nanotubes with several layers of graphene (MWNTs) or one of the mixtures thereof.

Step (a) of the method according to the invention consists in synthesizing, on a metal substrate, carbon nanotubes vertically aligned and extending perpendicularly to the surface of the substrate thereby forming a carpet of nanotubes the base of which corresponds to the substrate.

Within the scope of the present invention, the metal substrate on which the VACNTs are prepared is advantageously a substrate made of a material based on titanium, nickel, aluminium, copper, chromium, tantalum, platinum, gold, silver or stainless steel, silicon or carbon.

"Material based on a given metal" is taken to mean not just a material made of said non-alloyed metal but also a material made of an alloy comprising said metal and at least one other element and notably at least one other metal element.

It should be noted that, to minimise the weight of the electrodes and, consequently, the weight of the supercapacitors, light metal substrates such as aluminium based substrates are to be favoured. "Aluminium based material" is taken to mean not just a material made of non-alloyed aluminium but also a material made of aluminium alloy such as an aluminium and magnesium alloy, an aluminium and manganese alloy, an aluminium and copper alloy, an aluminium and silicon alloy, an aluminium, magnesium and silicon alloy or even an aluminium and zinc alloy.

The substrate implemented in the invention has any shape, i.e. a shape suited to the subsequent use of the electrode. As illustrative examples, this substrate may have a flat shape, a thread shape (woven thread, non-woven thread, fibre, grid), a strip shape, a hollow cylindrical shape or even an alveolar shape (foam). Typically the substrate implemented in the invention has a thickness comprised between 1 μm and 500 μm, notably between 2 μm and 200 μm, in particular, between 5 μm and 100 μm and, more particularly, between 10 μm and 75 μm.

Those skilled in the art know different methods making it possible to prepare vertically aligned nanotubes as defined previously, said methods being able to be used in step (a) of the method according to the invention.

As more particular examples of methods making it possible to prepare vertically aligned carbon nanotubes, it is possible to cite physical methods based on the sublimation of carbon such as electric arc, laser ablation methods or methods using a solar furnace and chemical methods such as the CVD method or consisting in pyrolizing carbon sources on metal catalysts. A method particularly suited to the preparation of CNTs is the CVD-injection method notably described in the article of Pinault et al, 2005 [4] and the article of Pinault et al, 2005 [5].

In a particular embodiment, the synthesis method implemented, i.e. using the chemical vapour deposition (CVD) technique at a temperature less than or equal to 650° C., is notably the method described in [6-9]. Since these techniques may be carried out by batch-to-batch technique/roll-to-roll technique, they are easily industrialisable.

Briefly, this synthesis takes place in the presence of a catalytic source and a carbon source. The catalytic source may be pre-deposited on the substrate or, conversely, be co-injected with the carbon source. The catalytic source is notably selected from transition metal metallocenes such as, for example, ferrocene, nickelocene, cobaltocene or any of the mixtures thereof. The carbon source, which may be liquid, solid or gaseous, is notably selected from hydrocarbons, alcohols, carbon monoxide, carbon halides, toluene, cyclohexane, plant based oils, benzylamine, acetonitrile, ethylene, acetylene, xylene, methane and any of the mixtures thereof. In a particular embodiment of this synthesis, ferrocene is conveyed into the reactor by means of a toluene solution in the form of an aerosol.

In this particular embodiment of step (a) of the method according to the invention, this synthesis is advantageously carried out a temperature comprised between 500° C. and 620° C. Similarly, this synthesis is typically carried out at a pressure comprised between $10^3$ Pa and $10^5$ Pa and, in particular, between $0.9 \cdot 10^5$ Pa and $10^5$ Pa.

As a function of the particular protocol used for the synthesis of the carbon nanotubes during step (a) of the method, the density of the vertically aligned carbon nanotubes extending perpendicularly to the metal substrate may be variable. The latter is advantageously comprised between $10^6$ and $10^{13}$ nanotubes·$cm^{-2}$ of substrate. It is thus possible to have a material having a dense carpet of vertically aligned carbon nanotubes, with of the order of $10^8$ to $10^{12}$ nanotubes·$cm^{-2}$ and notably of the order of $10^{11}$ to $10^{12}$ nanotubes·$cm^{-2}$.

Following the synthesis of the vertically aligned carbon nanotubes and prior to step (b), the vertically aligned carbon nanotubes may be subjected to an oxidizing treatment (or pre-treatment), i.e. aiming to oxidize the surface of the nanotubes implemented and/or to prepare the surface for a future oxidation by formation of radicals. An oxidation modifies the surface of the nanotubes notably by fixing and/or by introducing, on the ends or on defects of the nanotubes, oxygen rich groups such as carboxylic (—COOH), hydroxyl (—OH), alkoxyl (—OX with X representing an alkyl group, an acyl group or an aryl group), carbonyl (—C=O), percarbonic (—C—O—OH) and sometimes amide (—CONH) type groups.

Such an oxidizing treatment relies on two major types of surface modification based on:
    physical treatments such as treatment by plasma notably oxygen plasma, UV treatment, X or γ ray treatment, treatment by irradiation with electrons and with heavy ions or
    chemical treatments such as treatment with alcoholic potash, treatment by a strong acid (HCl, $H_2SO_4$, $HNO_3$, $HClO_4$), treatment with soda, treatment by a strong oxidizer ($KMnO_4$, $K_2Cr_2O_7$, $KClO_3$ or $CrO_3$ in hydrochloric acid, sulphuric acid or in nitric acid), treatment with ozone and thermal treatment under oxygenated atmosphere ($O_2$, $H_2O$, etc.).

Such nanotubes, once this oxidizing treatment has been implemented, may be in the form of surface modified nanotubes such as, for example, negatively charged nanotubes.

Step (b) of the method according to the present invention consists in applying, electrochemically, on the carpet of carbon nanotubes synthesized during step (a) on the metal substrate, a metal oxide matrix.

"Metal oxide matrix" is taken to mean, within the scope of the present invention, a structure being in the form of a film (or sheath), porous or non-porous, on the surface of the carbon nanotubes implemented in the method of the invention and essentially constituted of a metal oxide. In the carpet of carbon nanotubes such as obtained following step (a) of the method, the matrix is associated with the carbon nanotubes while being deposited over the whole length of the VACNTs, that is to say on and at the level of the lateral surface of the carbon nanotubes, being able to advantageously form a sheath around the nanotubes, as well as in the space between the nanotubes. Typically, advantageously, the thickness of this sheath is homogeneous for a carbon nanotube and, in a more advantageous manner, it is homogeneous for all of the carbon nanotubes of the carpet. In an alternative, the sheath of metal oxide is in the form of individualised needles, spheres or rosettes, the average diameter of which is comprised between 20 and 300 nm and notably between 50 and 250 nm, these needles, spheres or rosettes being able to be regularly distributed at the level of the lateral surface of the nanotubes or, conversely, the density of presence of these needles, spheres or rosettes increasing from the bottom (zone in contact with the substrate) to the top of the carpet (zone the furthest away from the substrate).

"Metal oxide" is taken to mean, within the scope of the present invention, any metal oxide typically used to coat carbon nanotubes and notably vertically aligned carbon nanotubes. Typically, the metal oxide implemented within the scope of the present invention is an oxide of at least one transition metal. Advantageously, the metal oxide implemented within the scope of the present invention is selected from the group constituted of a ruthenium oxide ($RuO_2$), a titanium oxide ($TiO_2$), a manganese oxide (MnO, $Mn_3O_4$, $Mn_2O_3$ or $MnO_2$), a copper oxide ($Cu_2O$), a nickel oxide (NiO, $NiO_2$ or $Ni_2O_3$), a cobalt oxide ($Co_2O_3$ or $Co_3O_4$), an iron oxide ($Fe_2O_3$ or $Fe_3O_4$), a chromium oxide ($CrO_2$, $CrO_3$ or $Cr_2O_3$), a vanadium oxide ($VO_2$, $V_2O_3$ or $V_2O_5$) and one of the mixtures thereof. "Mixture" is taken to mean, for example, an oxide selected from the group constituted of CuNiO, $NiCo_2O_4$, CoO—$RuO_2$, CuO—$RuO_2$, $Fe_2O_3$—$RuO_2$, NiO—$RuO_2$ and CuNiO—$RuO_2$.

As a function of the metal oxide to electrodeposit on the VACNTs, those skilled in the art will know how to determine, without inventive effort, the precursor of said metal oxide to implement. As illustrative non-limiting examples of such precursors may be cited acetates, nitrates, and halides of ruthenium, titanium, manganese, copper, nickel, cobalt, iron, chromium or vanadium such as ruthenium biacetate, titanium acetate, manganese(II) acetate, manganese(III) acetate, copper(II) acetate, nickel(II) acetate, cobalt(II) acetate, iron(II) acetate, iron(III) acetate, chromium(II) acetate, chromium(III) acetate, vanadium(III) acetate, titanium nitrate, manganese(II) nitrate, manganese(III) nitrate, copper(II) nitrate, nickel(II) nitrate, cobalt(II) nitrate, iron (II) nitrate, iron(III) nitrate, chromium(II) nitrate, chromium (III) nitrate, vanadium(III) nitrate, titanium chloride, manganese(II) chloride, manganese(III) chloride, copper(II) chloride, nickel(II) chloride, cobalt(II) chloride, iron(II) chloride, iron(III) chloride, chromium(II) chloride, chromium(III) chloride and vanadium(III) chloride. The acetate family will be favoured when the metal substrate is particularly sensitive to corrosion (such as aluminium for example), because it makes it possible to lower the deposition potential by around 0.2 to 0.3 V.

The precursor(s) of the metal oxide is(are) present, in the electrolytic solution implemented in the present invention, in a maximum quantity determined with respect to their solubility in the solvent employed. Advantageously, the precursor(s) of the metal oxide is(are) present in the electrolytic solution implemented in the present invention in a quantity comprised between 1 mM and the limit of solubility of the metal precursor(s) in the chosen solvent, typically this quantity is comprised between 1 mM and 1 M, notably between 0.01 M and 0.5 M, in particular, between 0.05 M and 0.2 M and, more particularly, of the order of 0.1 M (i.e. 0.1 M+0.02 M).

As explained previously, the essential elements of the electrolytic solution implemented in the method according to the invention are one (or more) precursor(s) of the metal oxide and an electrolyte being in the form of a salt in which the anion is a nitrate ($NO_3^-$). Advantageously, the cation of this salt is an alkali metal cation such as $Li^+$, $Na^+$, $K^+$; an alkaline earth metal cation such as $Mg^{2+}$, $Ca^{2+}$; or a metal cation of a transition metal such as $Cu^{2+}$, $Zn^{2+}$ and $Al^{3+}$. In a particular embodiment, the electrolyte implemented in the electrolytic solution is $LiNO_3$. Advantageously, the electrolyte is present in the electrolytic solution implemented in the present invention in a quantity at least five times greater and notably at least ten times greater than that of the metal precursor(s). Typically, the quantity of electrolyte is comprised between 0.1 M and 5 M, notably between 0.2 M and 2 M, in particular, between 0.3 M and 1 M and, more particularly, of the order of 0.5 M (i.e. 0.5 M±0.1 M).

The electrolytic solution implemented during step (b) of the method according to the invention may contain one or more solvent(s). Typically, this or these solvent(s) is(are) polar. "Polar solvent" is taken to mean within the scope of the present invention a solvent selected from the group constituted of water, deionised water, distilled water, hydroxylated solvents such as methanol, ethanol and isopropanol, low molecular weight liquid glycols such as ethylene glycol, dimethyl sulfoxide (DMSO), dimethylformamide (DMF), acetonitrile, acetone, tetrahydrofuran (THF) and mixtures thereof.

Advantageously, the solvent of the electrolytic solution implemented during step (b) of the method according to the invention includes or is water.

In an alternative, the solvent of the electrolytic solution implemented during step (b) of the method according to the invention includes or is acetonitrile.

In yet another alternative, the solvent of the electrolytic solution implemented during step (b) of the method according to the invention is a mixture of acetonitrile and water. The proportions of acetonitrile and water in the electrolytic solution implemented during step (b) of the method according to the invention may be 50 to 95% by volume for acetonitrile and the complement to 100% for water. Thus, the mixture may comprise between 70 and 90% by volume of acetonitrile and between 10 and 30% by volume of water and notably around 80% (i.e. 80%±5%) by volume of acetonitrile and around 20% (i.e. 20%±5%) by volume of water.

Advantageously, step (b) of the method according to the invention includes the sub-steps consisting in:

$b_1$) bringing into contact the carbon nanotubes synthesised on a metal substrate as defined previously with an electrolytic solution containing the precursor(s) of said metal oxide and at least one nitrate as defined previously;

$b_2$) polarising said carbon nanotubes, whereby a metal oxide matrix is electrochemically deposited on said carbon nanotubes.

As indicated previously, the electrochemical deposition of the electrically conductive polymer matrix on the carbon nanotubes during step (b) or during sub-step ($b_2$) of the method according to the invention may involve either a cyclic method, or a static method, pulsed or not, with either the voltage or the current which is imposed. In a particular embodiment, it is possible to carry out this electrochemical deposition by combining these different methods. In other words, the electrochemical deposition method may be carried out by a cyclic method and/or a pulsed or continuous galvanostatic method and/or a pulsed or continuous potentiostatic method. The deposition method consists in oxidizing a monomer precursor present in the electrolyte to polymerise it and to ensure its deposition in the form of an electroconductive polymer around and on the carbon nanotubes.

The electrochemical deposition during step (b) or during sub-step ($b_2$) of the method according to the invention is typically carried out in an electrochemical cell equipped with two electrodes (working electrode and counter-electrode) or three electrodes (working electrode, counter-electrode and reference electrode). The working electrode (or anode) corresponds to the metal substrate, notably made of a material based on aluminium, provided with carbon nanotubes, whereas the counter-electrode (or cathode) is, for example, a platinum grid or a platinated titanium plate or a paste of carbon black and activated carbon encapsulated in a stainless steel grid or a paste of carbon black, activated carbon and Teflon encapsulated in a stainless steel grid for the electrical contact. The counter-electrode has a surface and a capacitance suited to the surface and to the capacitance of the working electrode. When it is present, the reference electrode, which makes it possible to know, at any moment, the value of the voltage at the level of the working electrode, is typically made of metal such as, for example, a silver wire or a platinum wire.

The electrochemical device implemented in the invention includes an electrochemical cell such as defined previously associated with a voltage generator or a potentiostat.

In a particular embodiment of the method according to the invention, the chronopotentiometric method is favoured because it makes it possible to control more easily the quantity of oxide deposited. In particular, the chronopotentiometric method consists in applying a constant current to the electrode. During this application, the precursor(s) of the metal oxide is(are) oxidized. The sequenced mode consists in sequencing the times of application of current to the electrode and thus the deposition of metal oxide ($t_{ON}$) and the rest time ($t_{OFF}$) by applying, between the working electrode (anode) and the counter electrode (cathode), a constant current.

The deposition time corresponding to the oxidation of the precursor(s) is achieved by imposing a current for a given time ($t_{ON}$). During $t_{OFF}$, the precursor(s) is(are) not oxidized which leaves them the time to diffuse within the carpet of carbon nanotubes. This rest time $t_{OFF}$ may be achieved by opening the electric circuit or instead by imposing a lower current than that imposed during the deposition time $t_{ON}$ and not making it possible to oxidize the precursor(s). During this rest time $t_{OFF}$, an agitation of the electrolytic solution may be implemented to facilitate the diffusion of the precursor(s) within the carpet of vertically aligned carbon nanotubes.

The current generator of the device is able to deliver a current in a constant manner or in a discontinuous manner. Advantageously, the current generator of the device is able to deliver a current the intensity of which is comprised between 0.1 mA and 4 A, for example of the order of 0.5 mA (i.e. 0.5 mA+0.2 mA).

When the current is delivered in a discontinuous manner, the periods $t_{ON}$ are of the order of 5 s to 60 s, for example of the order of 10 s (i.e. 10 s±1 s), and the periods $t_{OFF}$ are of the order of 5 s to 120 s, for example of the order of 5 s (i.e. 5 s±1 s). The ratio $t_{ON}/t_{OFF}$ is generally comprised between 1 and 0.1 and, in particular, between 1 and 0.5. Typically, when the current is delivered in a discontinuous manner, the number of cycles is comprised between 10 and 500, notably between 100 and 300. As particular examples, the number of cycles may be of the order of 80 (i.e. 80±10) or of the order of 200 (i.e. 200±20).

The duration of step (b) or sub-step ($b_2$) of the method according to the invention is variable from several minutes to several hours. Typically, this duration is comprised between 5 min and 8 h, advantageously between 10 min and 4 h and, in particular, between 15 min and 2 h. It depends on the quantity of metal oxide to deposit to have a homogeneous deposition around the vertically aligned carbon nanotubes. Those skilled in the art will know how to adapt, without inventive effort, this duration as a function of the density and the length of the vertically aligned carbon nanotubes and the quantity of metal oxide to deposit.

Step (b) and notably sub-step ($b_2$) of the method according to the invention are carried out at a temperature comprised between 15° C. and 100° C. and advantageously at ambient temperature (i.e. 22° C.±5° C.). The temperature could be adjusted according to the desired viscosity for the electrolytic solution.

Furthermore, step (b) and notably sub-step ($b_2$) of the method according to the invention can be carried out under non-controlled atmosphere.

It should be noted that the electrochemical deposition during step (b) and notably sub-step ($b_2$) of the method according to the invention may be industrialised, for example by a batch-to-batch or roll-to-roll technique with the metal substrate, notably made of an aluminium based material bathed in an electrolytic solution such as defined previously.

The duration of step (b) and notably of sub-step ($b_2$) of the method according to the invention makes it possible to adjust the percentage by weight of metal oxide compared to the total weight of the composite corresponding to the vertically aligned carbon nanotubes coated with this metal oxide to maximise the capacitance of the composite once manufactured and this in order to provide a supercapacitor using such a composite as electrode, which has the highest possible capacitance. The metal oxide represents a percentage by weight compared to the total weight of said composite which can go up to 90%, notably comprised between 10% and 80% and, in particular, between 40% and 70%. The weight of the metal oxide and that of the composite may be obtained by TGA (Thermo Gravimetric Analysis) and/or by weighing and/or by integration of the current having traversed the electric circuit during the polymerisation step.

Following step (b) and notably following sub-step ($b_2$), the method according to the invention may have a rinsing step and possibly a drying step.

The rinsing step has, for main aim, to clean, to remove residues/impurities of the metal oxide precursor type which could remain on parts of the substrate, the carbon nanotubes or the metal oxide matrix and which could not have been deposited. Such residues/impurities could lead to problems during the encapsulation step and malfunctions of the supercapacitor. Advantageously, the rinsing step is carried out by soaking the metal substrate provided with the carbon nanotubes and the metal oxide matrix in water, ethanol, acetonitrile or one of the mixtures thereof. The rinsing consists in soaking the metal substrate provided with the carbon nanotubes and the metal oxide matrix in water for a variable time of 1 to 30 min and renewing the operation if necessary up to five times for example.

In addition, for the optional step of drying the metal substrate provided with the carbon nanotubes and the metal oxide matrix, after rinsing with water, it is rinsed in ethanol then left in the open air in order that the residual water and ethanol evaporate slowly. In an alternative, the metal substrate provided with the carbon nanotubes and the metal oxide matrix, once rinsed, may be dried by heating it, in an oven under vacuum between 50° C. and 200° C. and notably at a temperature of the order of 80° C. (80° C.±10° C.), or by means of an infrared lamp, for a duration comprised between 12 h and 36 h and notably of the order of 24 h (24 h±6 h). This alternative may be implemented in the case of a continuous method.

The present invention also relates to an electrode capable of being prepared by the method according to the invention such as defined previously. This electrode has a metal substrate provided with carbon nanotubes and a metal oxide matrix. It is thus a monolayer electrode.

Everything that has been indicated previously regarding the metal substrate also applies to the electrode according to the present invention. Within the scope of the electrode according to the invention, the metal substrate is a substrate made of an aluminium based material.

Advantageously, the density of the vertically aligned carbon nanotubes, in the electrode according to the present invention, may be variable. The latter is advantageously comprised between $10^6$ and $10^{13}$ nanotubes·$cm^{-2}$ of electrode. It is thereby possible to have a material having a dense carpet of vertically aligned carbon nanotubes, with of the order of $10^8$ to $10^{12}$ nanotubes·$cm^{-2}$ and notably of the order of $10^{11}$ to $10^{12}$ nanotubes·$cm^{-2}$.

The percentage by weight of the metal oxide matrix expressed compared to the total weight of the composite comprising the carbon nanotubes and this matrix is comprised between 10% and 90%, notably comprised between 10% and 80%, in particular, comprised between 40% and 70%.

In the electrode according to the invention, the carbon nanotubes advantageously have a length greater than 10 µm. In certain embodiments, this length may be greater than 20 µm, or even greater than 30 µm or 50 µm.

Finally, the electrode according to the invention advantageously has a capacitance of at least 160 mF/$cm^2$ or 100 F·$g^{-1}$ compared to the total weight of the composite.

The present invention also relates to the use of such an electrode or capable of being prepared by the method of the invention as positive/negative electrode of a device for storing and restoring electricity such as a supercapacitor or a battery, as electrode for photovoltaic device, in materials for the storage of $CO_2$ or as electrode for electrochemical sensors. Thus, the present invention relates to a device comprising an electrode according to the present invention or capable of being prepared by the method of the invention, said device being selected from the group constituted of a device for storing and restoring electricity such as a supercapacitor or a battery; a photovoltaic device; a material for the storage of $CO_2$ and an electrochemical sensor.

In a particular embodiment, a device for storing and restoring electricity according to the invention includes at least two monolayer electrodes (positive and negative) or instead at least three electrodes of which two monolayer electrodes (positive) and a double layer electrode (negative). As a reminder, a monolayer electrode only comprises a single active surface, whereas a double layer electrode comprises two active surfaces respectively on its two opposite faces.

Other characteristics and advantages of the present invention will become clearer to those skilled in the art on reading the following examples given for purely illustrative purposes and in no way limiting, with reference to the appended drawings.

DETAILED DESCRIPTION OF PARTICULAR EMBODIMENTS

I. Effect of the Electrolyte on an Aluminium Collector

The carpets of VACNTs on aluminium often disbond and holes may appear in the collector and this because of corrosion of the aluminium, in contact with the electrolyte and under electrochemical stress. Consequently, the inventors have sought an aqueous electrolyte which does not attack aluminium in the potential ranges used during the electrochemical deposition of metal oxide such as manganese oxide.

To this end, several electrolytes listed in Table I hereafter were tested.

TABLE I

| Salt | Molar mass in g/mol | Solubility in water | |
|---|---|---|---|
| | | g/L | mol/L |
| LiTFSI | 287.09 | 5700 | 19.9 |
| K2SO4 | 174.26 | 120 | 0.7 |
| LiClO4 | 106.39 | 375 | 3.5 |
| Li2SO4 | 109.94 | 385 | 3.5 |
| LiCl | 42.394 | 769 | 18.1 |
| Na2SO4 | 142.04 | 271 | 1.9 |
| LiNO3 | 68.95 | 1020 | 14.8 |

The limited solubility of $K_2SO_4$ in water implies a limited concentration of salt. Also, all the electrolytes were used at a concentration of 0.5 mol/L.

The aluminium pellets used for this study were pellets of aluminium alloy (DP76) comprising a very high percentage of aluminium (>99%), and all cleaned beforehand. The tests were carried out with cells with 3 electrodes, where the working electrode was the pellet of DP76, the reference electrode a KCl saturated calomel electrode (SCE) and the counter-electrode was an activated carbon electrode.

Figure 1:
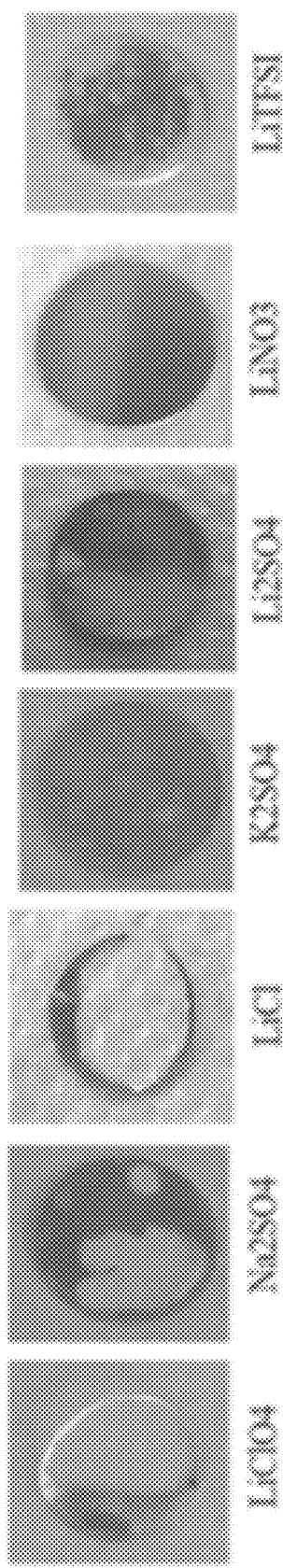
FIG. 1 shows aluminium pellets after a polarisation at 1.3 V vs a KCl saturated calomel electrode (CSE) for 60 min in electrolytes containing different electrolyte salts.

The first step of the study was the characterisation by measurement C(V) of each system, which provides an insight of the corrosive effect of the electrolyte and makes it possible to identify the corrosion potential. Next, the cell was subjected to a fixed potential of 1.3 V for a duration of 60 min and the evolution of the weight of the pellet was monitored by an ultra-microbalance, in order to determine the variation in the weight of the pellet that would be linked to the dissolution of aluminium following its oxidation in the electrolyte. FIG. 1 gives an overview of the pellets after this experiment.

All the electrolyte salts lead to a dissolution of the pellet except $LiNO_3$. The salts LiCl, $LiClO_4$ and $Na_2SO_4$ seem to be the most corrosive. For these three salts, the loss by weight of the pellet is respectively 85%, 65% and 43%. It is zero in the electrolyte based on $LiNO_3$.

Furthermore, the variations in weights in the electrolyte based on $LiNO_3$ are very small, and no apparent damage is present on the aluminium pellets at least up to 1.5V vs SCE which is interesting and sufficient for electrochemical depositions of metal oxide.

Finally, chronopotentiometry tests (imposed current) also show the passive character of the aluminium surface in the presence of $LiNO_3$ (increase in the potential on the application of the current up to 1.5 V without any lowering thereafter). In the other salts, it is possible to identify easily a phenomenon of trans-passivation and the passage in active zone where the material can oxidize at relatively low potentials.

In conclusion, the salt substrate based on nitrate anions ($NO_3^-$) such as $LiNO_3$ is retained for the remainder of the study on aluminium since the presence of $Cl^-$, $SO_4^{2-}$, $TFSI^-$ and $ClO_4^-$ anions leads to corrosion of the aluminium.

II. Preparation of VACNTs

II.1. Method of Growth on Stainless Steel

The CVD injection method enables the efficient and reproducible growth of VACNTs on substrates made of 316L stainless steel in the form of pellets having a thickness comprised between 50 and 500 µm and a diameter comprised between 8 and 16 mm.

To do so, the method requires the initial deposition of a sub-layer of ceramic (based on SiOx) obtained from toluene and tetraethyl orthosilicate (TEOS), on the surface of the substrate before the nanotube growth step. Different injection durations were thus tested with the aim of depositing a ceramic sub-layer which is both sufficiently thick to fulfil its role of diffusion barrier for the metal particles and sufficiently thin so as not to increase the electrical resistance of the electrodes. The nature of the reaction atmosphere makes it possible to play on the diameter and the density of the carbon nanotubes of the carpet formed on the metal substrate. The international patent WO 2009/103925 notably describes such a method [10].

Low density VACNTs on stainless steel are obtained at 800 or 850° C. from a toluene/ferrocene solution (2.5% by weight) injected under argon uniquely. The toluene/ferrocene synthesis duration depends on the desired thickness of carpet, typically 3 to 5 min for 100 µm.

High density VACNTs on stainless steel are obtained from the same toluene/ferrocene solution but with a reaction atmosphere based on argon/hydrogen and acetylene, for a temperature varying between 600 and 800° C.

Thus, the deposition of metal oxide ($MnO_2$) was carried out on the carpet of VACNTs on stainless steel (15 to 200 µM length and 10-40 nm average outer diameter) controlled by scanning electron microscopy (SEM) and transmission electron microscopy (TEM). The measured surface densities lie in the range 1 to $5\times10^9$ VACNT/$cm^2$ for VACNTs of average diameter of 40 nm (low density) and in the range 1 to $5\times10^{11}$ VANTC/$cm^2$ for VACNTs of average diameter of 10 nm (high density).

II.2. Method of Growth on Aluminium

Concerning the direct CVD growth of VACNTs on aluminium, the lowering of the growth temperature of the carpet of aligned CNTs (580 to 615° C. depending on the reaction atmospheres) is possible thanks notably to the use of a gaseous carbon source ($C_2H_2$) in the presence of hydrogen and ferrocene as metal precursor.

For high densities on aluminium, one works around 600° C. with a 10% toluene/ferrocene solution and a mixture of argon/hydrogen and acetylene. The duration of the toluene/ferrocene synthesis also depends on the desired thickness of carpet, typically 20 or 30 min to reach 100 µm.

Despite CNT growth speeds lower than at high temperatures (<10 µm·min$^{-1}$ at 580° C.), it is possible to produce VACNT/Al electrodes without pre-treatment of the aluminium (crude or alloy) surface. The characteristics (controllable length of 10 to 100 µm, average outer diameter: 6-12 nm) are at the level of the prior art. The measured surface densities are much greater than those obtained on stainless steel without acetylene: in the range 1 to 5×10$^{11}$ CNT/cm$^2$.

The international application WO 2015/071408 notably describes such methods [6].

III. Deposition of Manganese Oxide by Electrochemical Deposition

Different precursors based on manganese acetate were used in order to deposit by oxidation manganese oxides on the surface of the VACNTs.

Depositions were carried out on VACNTs on aluminium, of high densities (10$^{11}$ CNT/cm$^2$) and of 20 µm thickness in an aqueous electrolyte comprising a manganese oxide precursor being in the form of 0.08 mol·L$^{-1}$ manganese acetate (Mnac(II)) with LiNO$_3$ (0.5 mol·L$^{-1}$) in H$_2$O or 0.1 mol·L$^{-1}$ Mnac(III) with LiNO$_3$ (0.5 mol·L$^{-1}$) in H$_2$O.

The electrochemical method used here is the continuous chronopotentiometric method. An intensity of 0.3 mA is applied on the electrode for 60 min in order to deposit manganese oxide on its surface. It is possible to vary the quantity of oxide deposited by increasing or decreasing the duration of the electrodeposition (from 2 to 90 min). After the electrochemical deposition of the oxide layer, the electrodes are rinsed in water to evacuate traces of oxide precursor. To measure the weight of MnO$_2$ deposited, the rinsing with water is followed by a rinsing with ethanol then drying in an oven at 80° C. under vacuum for one day.

Figure 2:
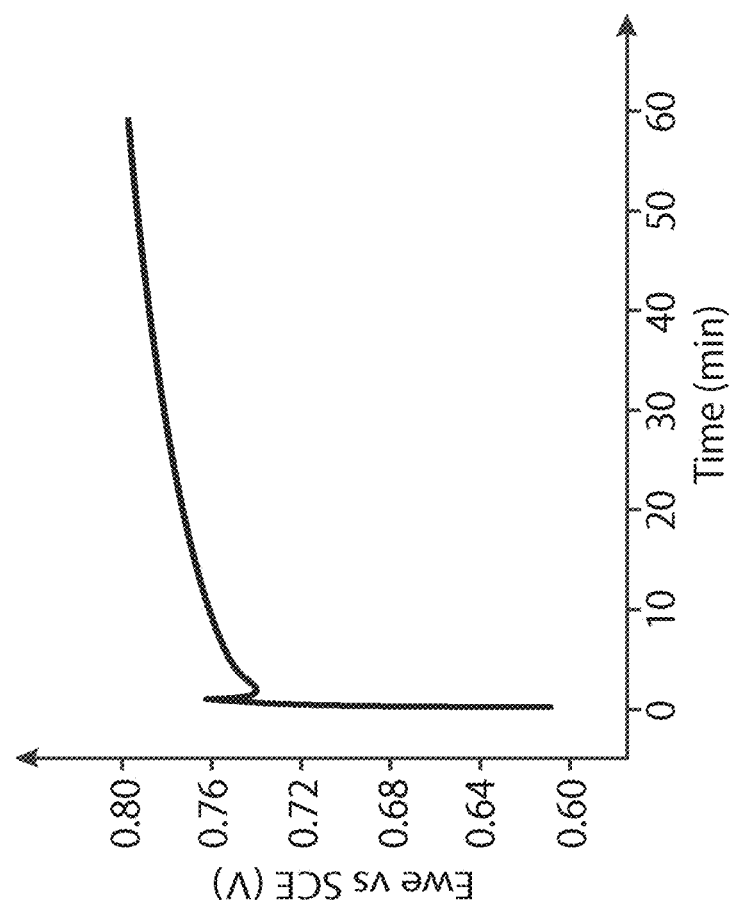
FIG. 2 shows the variation in the potential at the level of the working electrode as a function of time and during deposition by continuous chronopotentiometry carried out on VACNTs/Al using Mnac(III) as precursor.

Within the scope of the deposition by continuous chronopotentiometry carried out on VACNTs/aluminium using a Mnac(III) precursor, a rapid increase in the potential takes place up to 0.76 V corresponding to the complete covering of the working electrode by the electrolyte. Another increase, slower this time, corresponds to the deposition of manganese oxide on an electrode more and more covered with this same oxide (FIG. 2).

Figure 3A:
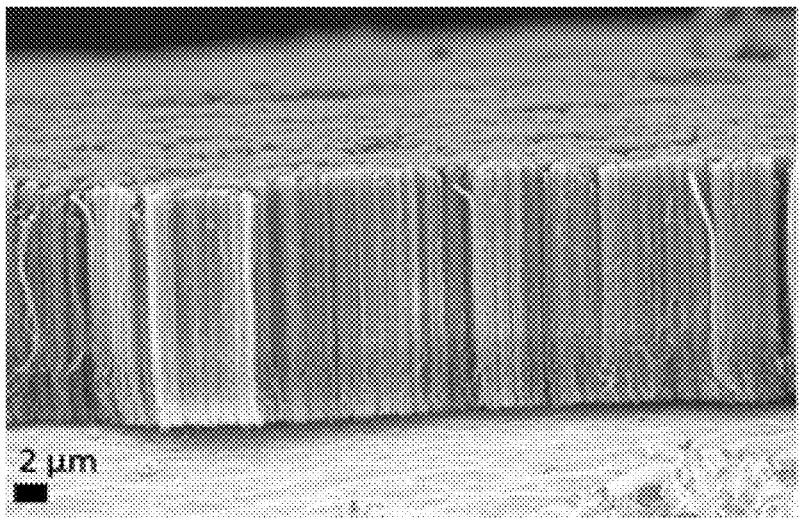
FIG. 3 shows scanning electron microscopy (SEM) micrographs of bare VACNTs on aluminium (FIG. 3A) and the same VACNTs after an electrochemical deposition using manganese(III) acetate as $MnO_2$ precursor at two different enlargements (FIGS. 3B and 3C).
Figure 3B:
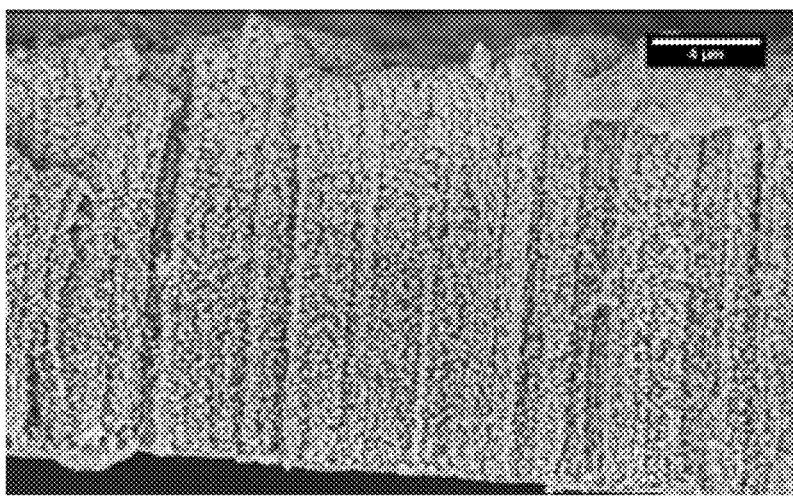
Figure 3C:
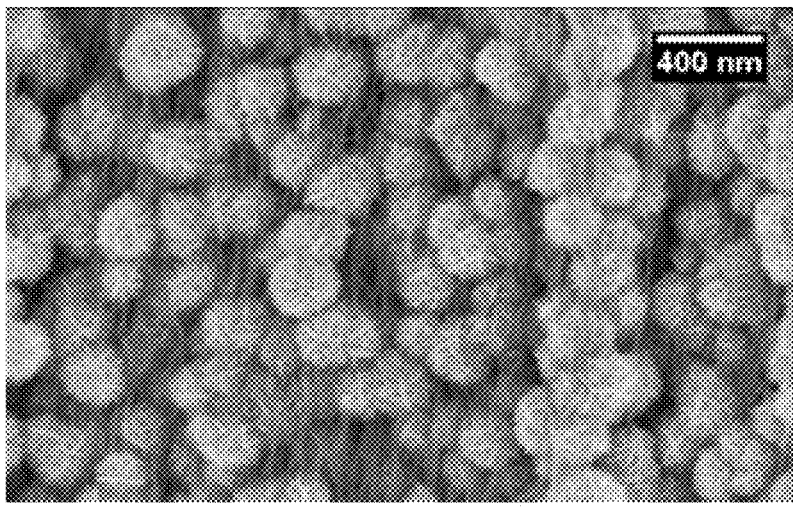
Figure 4A:
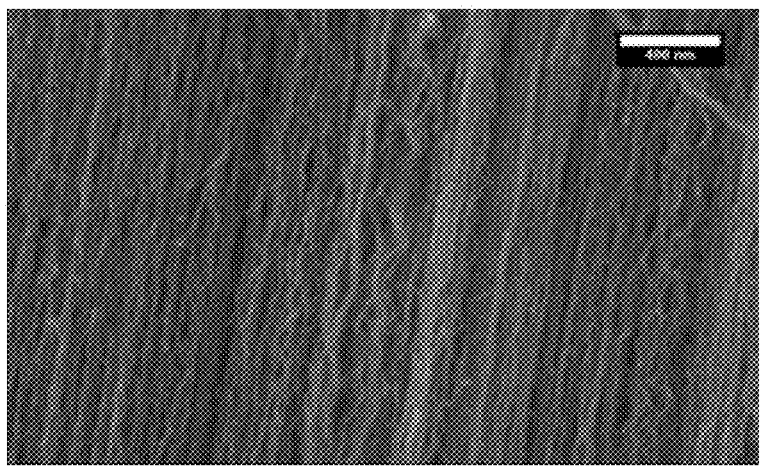
FIG. 4 shows SEM micrographs of bare VACNTs on aluminium (FIG. 4A) and the same VACNTs after an electrochemical deposition using manganese(III) acetate as $MnO_2$ precursor (FIG. 4B).
Figure 4B:
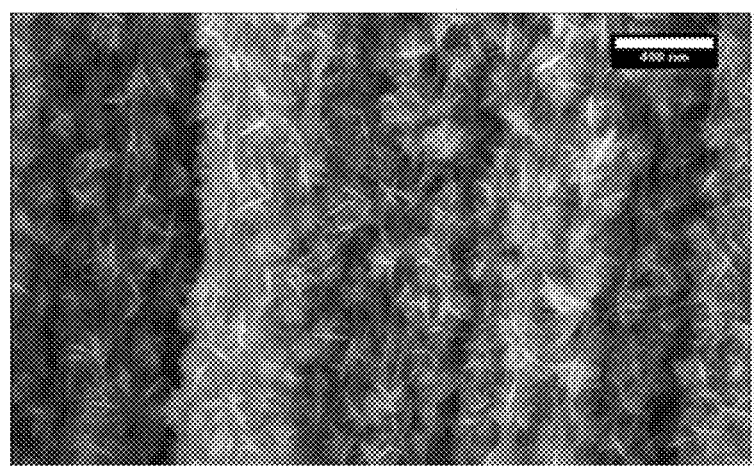
Figure 5:
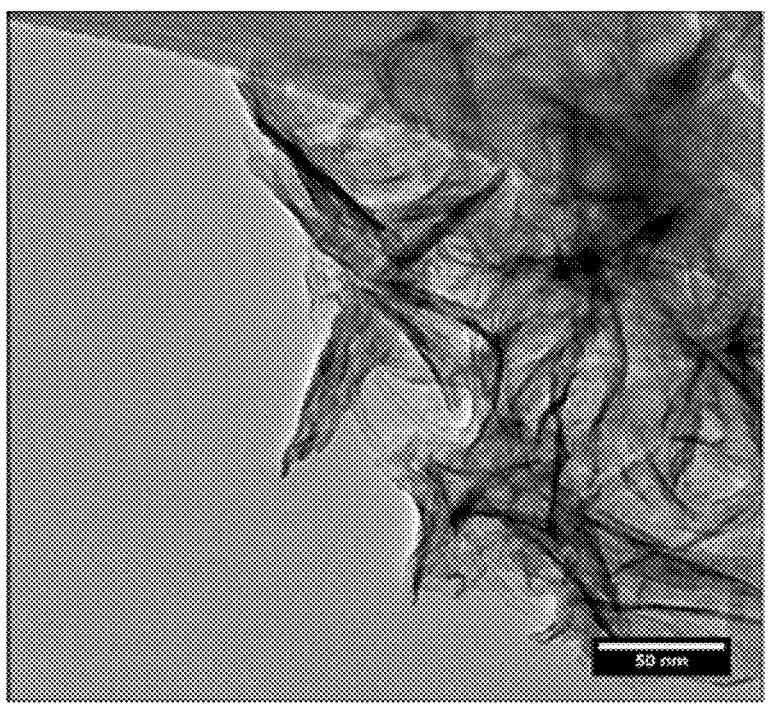
FIG. 5 shows a transmission electron microscopy (TEM) micrograph of CNTs after an electrochemical deposition using manganese(II) acetate as $MnO_2$ precursor.

In these deposition conditions, the carpet of VACNTs is covered in a homogeneous manner by manganese oxide over the whole of its depth (FIGS. 3 to 5). The manganese oxide may be in the form of very porous spheres in the inter-tube space of the carpet of VACNTs and in the whole of its thickness. These spheres have diameters comprised between 150 and 250 nm (FIGS. 3B and 3C).

In order to characterise the capacitance by surface unit of the electrode according to the invention and compare it with that of the same electrode (same substrate provided with carbon nanotubes and same specific surface) but without deposition of metal oxide, the cyclic voltammetry technique was used by imposing a voltage between 0 and −0.8 V vs saturated calomel electrode at a scanning speed of 2 mV/s for 5 cycles, in an aqueous electrolyte (0.5 M LiNO$_3$).

After the deposition of manganese oxide from Mnac(II), the performances are greatly improved. The capacitances of bare VACNTs of the order of 30 F/g (7 mF/cm$^2$) pass to 140-170 F/g (120 mF/cm$^2$). After the deposition of manganese oxide from Mnac(III), the capacitance of the composite was evaluated at 260 F/g, i.e. 8 times more than that of bare VACNTs.

REFERENCES

[1] Fan et al, 2008, «High dispersion of γ-MnO$_2$ on well-aligned carbon nanotube arrays and its application in supercapacitors», Diamond & Related Materials, vol. 17, pages 1943-1948.

[2] Amade et al, 2011, «Optimization of MnO$_2$/vertically aligned carbon nanotube composite for supercapacitor application», J. of Power Sources, vol. 196, pages 5779-5783.

[3] Patent application CN 103346021 in the name of the Aluminium Corporation of China Ltd published on the 9 Oct. 2013.

[4] Pinault et al, 2005, «Growth of multiwalled carbon nanotubes during the initial stages of aerosol-assisted CCVD», Carbon, vol. 43, pages 2968-2976.

[5] Pinault et al, 2005, «Evidence of sequential lift in growth of aligned multi-walled carbon nanotube multilayers», Nano Lett., vol. 5, pages 2394-2398.

[6] International application WO 2015/071408 in the name of the CEA published on the 21 May 2015.

[7] Dorfler et al, 2013, «High power supercap electrodes based on vertically aligned carbon nanotubes on aluminum», J. of Power Sources, vol. 227, pages 218-228.

[8] Liatard et al, 2015, «Vertically aligned carbon nanotubes on aluminum as a light-weight positive electrode for lithium-polysulfide batteries», Chemical Communications, vol. 51, pages 7749-7752.

[9] Arcila-Velez et al, 2014, «Roll-to-roll synthesis of vertically aligned carbon nanotube electrodes for electrical double layer capacitors», Nano Energy, vol. 8, pages 9-16.

[10] International application WO 2009/103925 in the name of the CEA published on the 27 Aug. 2009.

The invention claimed is:

1. A method for preparing an electrode comprising a metal substrate, vertically aligned carbon nanotubes and a metal oxide deposited over the whole length of said vertically aligned carbon nanotubes, said method comprising:
   a) synthesizing, on a metal substrate, a carpet of vertically aligned carbon nanotubes; and
   b) electrochemically depositing said metal oxide on said carbon nanotubes from an electrolytic solution comprising at least one precursor of said metal oxide and at least one nitrate as anion of the electrolyte.

2. The method according to claim 1, wherein said metal substrate comprises titanium, nickel, aluminium, copper, chromium, tantalum, platinum, gold, silver or stainless steel, silicon or carbon.

3. The method according to claim 1, wherein following said synthesizing (a) and prior to said depositing (b), the vertically aligned carbon nanotubes may be are subjected to an oxidizing treatment.

4. The method according to claim 1, wherein said metal oxide is an oxide of at least one transition metal.

5. The method according to claim 1, wherein said metal oxide is at least one selected from the group consisting of a ruthenium oxide, a titanium oxide, a manganese oxide, a copper oxide, a nickel oxide, a cobalt oxide, an iron oxide, a chromium oxide, a vanadium oxide and one of the mixtures thereof.

6. The method according to claim 1, wherein said precursor of said metal oxide is selected from the group consisting of acetates, nitrates, and halides of ruthenium, titanium, manganese, copper, nickel, cobalt, iron, chromium or vanadium.

7. The method according to claim 1, wherein said precursor of said metal oxide is selected from the group consisting of ruthenium biacetate, titanium acetate, manganese(II) acetate, manganese(III) acetate, copper(II) acetate, nickel(II) acetate, cobalt(II) acetate, iron(II) acetate, iron (III) acetate, chromium(II) acetate, chromium(III) acetate, vanadium(III) acetate, titanium nitrate, manganese(II) nitrate, manganese(III) nitrate, copper(II) nitrate, nickel(II) nitrate, cobalt(II) nitrate, iron(II) nitrate, iron(III) nitrate, chromium(II) nitrate, chromium(III) nitrate, vanadium(III) nitrate, titanium chloride, manganese(II) chloride, manganese(III) chloride, copper(II) chloride, nickel(II) chloride, cobalt(II) chloride, iron(II) chloride, iron(III) chloride, chromium(II) chloride, chromium(III) chloride and vanadium (III) chloride.

8. The method according to claim 1, wherein said precursor of said metal oxide is present in said electrolytic solution in a quantity comprised between 1 mM to 1 M.

9. The method according to claim 1, wherein said electrolytic solution comprises at least one polar solvent.

10. The method according to claim 1, wherein following said depositing (b), said method further comprises a rinsing step and optionally a drying step.

11. An electrode, obtained by the method according to claim 1, wherein the metal substrate comprises aluminium.

12. The electrode according to claim 11, wherein a density of said vertically aligned carbon nanotubes is comprised between $10^6$ and $10^{13}$ nanotubes·cm$^{-2}$ of electrode.

13. A device for storing and restoring electricity, comprising an electrode according to claim 11.

* * * * *